United States Patent Office 3,450,722
Patented June 17, 1969

3,450,722
PREPARATION OF BISNORCHOLANIC ACID DERIVATIVES
Francisco S. Alvarez, Palo Alto, Calif., assignor to Syntex Corporation, Panama, Panama, a corporation of Panama
No Drawing. Filed May 9, 1967, Ser. No. 637,098
Int. Cl. C07c 167/00, 169/00
U.S. Cl. 260—397.1       10 Claims

ABSTRACT OF THE DISCLOSURE

3β,6β-diacyloxy-5α-hydroxy bisnorcholanic acid and 3β,5α,6β-triacyloxy bisnorcholanic acid derivatives prepared from 3β-acyloxy stigmasterols.

The present invention pertains to a process for the preparation of bisnorcholanic acid derivatives.

In particular, this invention relates to a process for the prepartion of 3β,5α,6β-trisubstituted bisnorcholanic acid derivatives from 3β-acyloxy stigmasterols.

The present process can be illustrated by the following reaction sequence:

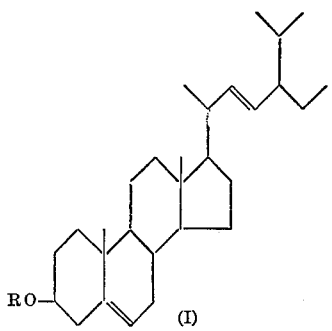

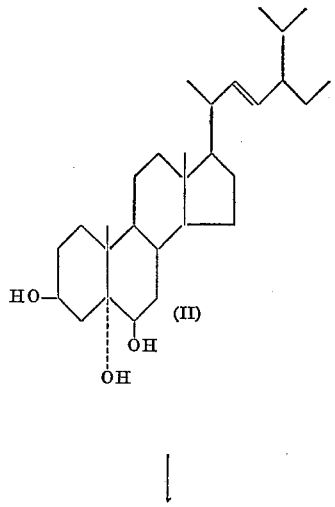

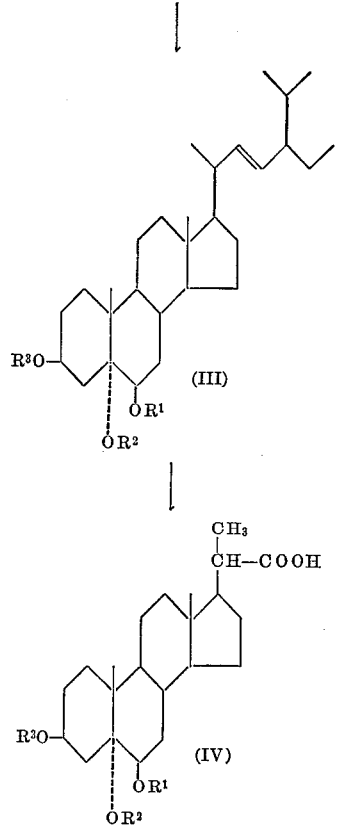

where each of R, $R^1$ and $R^3$ is a lower hydrocarbon carboxylic acyl group of from 1 to 7 carbon atoms:
$R^2$ is hydrogen or a lower hydrocarbon carboxylic acyloxy group from 1 to 7 carbon atoms;
Preferably, each of $R^1$ and $R^3$ is the same acyl group, and when $R^2$ is an acyl group, preferably each of $R^1$, $R^2$ and $R^3$ is the same acyl group.

The hydrocarbon carboxylic acyloxy groups of the compounds of the present invention are straight, branched, cyclic or aliphatic chain structures. The structure is saturated, unsaturated, or aromatic and optionally substituted by groups such as hydroxy, alkoxy containing up to 5 carbon atoms, and the like. Typical esters thus include acetate, propionate, caproate, trimethyl acetate, β-chloropropionate, benzoate, and the like. An especially preferred hydrocarbon carboxylic acyloxy group for the present process is the acetoxy group.

The present novel process consists of the following three steps, epoxidation and hydrolysis of a 3β-acyloxy stigmasterol (a compound of Formula I) to obtain 5α,6β-dihydroxy stigmasterol (the compound of Formula II); esterification of 5α,6β-dihydroxy stigmasterol to obtain either a 3β,6β-diacyloxy-5α-hydroxy stigmasterol or a 3β,5α,6β-triacyloxy stigmasterol (compounds of Formula III); and ozonolysis and oxidative ozonide cleavage of either a 3β,6β-diacyloxy-5α-hydroxy stigmasterol or a 3β,5α,6β-triacyloxy stigmasterol to obtain a corresponding esterified 3β,5α,6β-trihydroxy bisnorcholanic acid derivative (a compound of Formula IV).

Thus, by the present process, 3β,5α,6β-triacetoxy bisnorcholanic acid (compound of Formula IV where $R^1=R^2=R^3$=acetyl) or 3β,6β-diacetoxy-5α-hydroxy bisnorcholanic acid (compound of Formula IV where $R^1=R^3$=acetyl and $R^2$=H) is prepared from stigmasterol acetate (compound of Formula I where R=acetyl) in three steps.

Preparation of the same products from the same starting material by conventional methods known to the art requires at least five steps.

The bisnorcholanic acid derivatives, the 3β,6β-diacyloxy-5α-hydroxy and 3β,5α,6β-triacyloxy bisnorcholanic acid products (compounds of Formula IV) of the present process, are useful intermediates for preparation of known steroids. For example, the bisnorcholanic derivative can be hydrolized to obtain 3β,5α,6β-trihydroxybisnorcholanic acid. This trihydroxy steroid can be converted into the 5α-bromo, 3β,6β-dihydroxy compound, which in turn may be transformed into a 19-nor compound by techniques well-known to the art. The carboxylic acid group at the 20 position can be eliminated and a keto group can be introduced in its place by techniques known to the art. Thus, by starting with stigmasterol acetate, one can obtain 19-nor progesterone, using the present process and known techniques.

The bisnorcholanic acid derivatives can be transformed into Δ⁵-bisnorcholanic acid, 5α,6α-oxido bisnorcholanic acid or 5β,6β-oxido bisnorcholanic acid by processes known to the art.

The C-21 esters of 3β,5α,6β-trihydroxy bisnorcholanic acid are intermediates for the preparation of known compounds. For example, the methyl ester of 3β,5α,6β-trihydroxy bisnorcholanic acid is an intermediate for the preparation of ecdyson-like steroids used in insect population control, see for example U.S. copending application No. 506,410 filed Nov. 4, 1965 now Pat. No. 3,378,547.

The present novel process consists of treating a 3β-acyloxy stigmasterol, normally 3β-acetoxy stigmasterol, (a compound of Formula I) with a molar equivalent or a slight excess (about 1.05 molar equivalents) of a peracid in an inert organic solvent. Typical peracids that are employed in the present process include performic acid, peracetic acid, perbenzoic acid, and the like. The reaction is carried out at temperatures from about —80° C. to about 50° C. conveniently at room temperature. The reaction mixture is allowed to stand from about 15 minutes to about 12 hours, normally from about 30 minutes to 3 hours. Typical inert organic solvents employed in this step include halogenated hydrocarbons, e.g. chlorofrom, methylene chloride, and the like; hydrocarbons, e.g. benzene, hexane, and the like; alkanols, e.g. methanol, ethanol; and the like.

An aqueous acidic mixture is then added to the reaction mixture. The addition is carried out at temperatures between about —30° C. and about 150° C. conveniently at room temperature. Suitable aqueous acids include aqueous sulfuric acid, aqueous hydrochloric acid, aqueous acetic acid, aqueous formic acid, and the like, containing from about 1% to about 15% by weight of the acid. Optionally, an inert co-solvent miscible with water can be utilized in conjunction with the aqueous acid. Typical co-solvents include water miscible alkanols such as methanol and ethanol; water miscible ethers such as dioxane and tetrahydrofuran; and the like. The product of the above step, 3β,5α,6β-trihydroxy stigmasterol (the compound of Formula II) is quite polar and insoluble in most organic solvents; accordingly, the product is readily isolated through simple filtration or recrystallization.

The above intermediate (the compound of Formula II) thus obtained is next esterified to obtain the compounds of Formula III. This is accomplished through the use of conventional acylating techniques, for example, by treatment with a hydrocarbon carboxylic acid anhydride such as acetic anhydride, propionic anhydride, caproic anhydride, and the like, optionally in the presence of an acid catalyst, such as p-toluenesulfonic acid, perchloric acid, sulfuric acid, and the like; or by treatment with a hydrocarbon carboxylic acid halide, such as acetyl chloride, acetyl bromide, propionyl iodide, and the like; or by treatment with a hydrocarbon carboxylic acid such as formic acid, acetic acid, propionic acid, and the like, in the presence of an acid catalyst, such as p-toluenesulfonic acid, hydrogen chloride, sulfuric acid, and the like. In one typical procedure, the triol (the compound of Formula II) is treated at about 45° C. with acetic anhydride in the presence of acetic acid and perchloric acid, optionally with a solvent such as ethyl acetate, for about 30 minutes. In the course of this acylation, any monoacylated side products formed in the previous reaction are converted to the triacetate (a compound of Formula III, where $R^1=R^2=R^3=$acetyl), thereby providing a reaction product of substantial homogeneity and eliminating the requirements for extensive purification upon completion of the preceding reaction.

Upon treating the triol (the compound of Formula II), with either a hydrocarbon carboxylic acid halide or a hydrocarbon carboxyic acid anhydride in the presence of an excess of a base, the 3β,6β-diacyloxy-5α-hydroxy stigmasterol (a compound of Formula III where $R^1$ and $R^3$ are acyl and $R^2$ is H) is obtained. Typical bases include tertiary amines, such as pyridine, triethyl amine, and the like.

The above esterified steroid of Formula III is isolated by conventional techniques. For example, the organic solvent is distilled off at room temperature under reduced pressure. The residue is taken up in an inert organic solvent non-miscible with water, washed with water to neutrality, dried and evaporated.

The above isolated esterified steroid (a compound of Formula III) is treated with at least a molar equivalent of ozone to obtain the bisnorcholanic acid derivatives (the compounds of Formula IV). The reaction is conducted at temperatures of from about —110° C. to about 10° C., normally between —90° C. and —20° C. Generally an excess of ozone is employed in the reaction. The amount in excess is not critical, but economic factors usually limit the amount in excess to about 0.1 to about 1.0 molar equivalents per molar equivalent of etherified stigmasterol used.

The ozonolysis is conducted in a non-aqueous inert organic solvent which has a melting point temperature lower than the reaction temperature used, i.e. the solvent is liquid at the reaction temperature. Typical solvents include hydrocarbons such as pentane, hexane, and the like; halogenated hydrocarbons such as methylene chloride, chloroform, tetrafluoromethane, and the like; esters such as ethyl acetate, ethyl propionate, and the like. Mixtures of solvents can also be employed. The minimum amount of solvent that is used in the process will be dictated by the solubility of the esterified steroid (a compound of Formula III) in the solvent or solvent mixture. Sufficient solvent is normally added to insure that the esterified steroid is completely dissolved.

At the completion of the addition of ozone, an aqueous acidic hydrogen peroxide mixture is added which contains a molar equivalent of hydrogen peroxide based upon the molar equivalent of the esterified steroid employed in this step. The addition is conducted slowly at temperatures of from about —30° C. to about 20° C., conveniently at about 0° C. The aqueous acidic hydrogen peroxide mixture is comprised of about 2% to about 10% by weight hydrogen peroxide; about 5% to about 23% by weight water; and of about 93% to about 67% by weight a mineral acid or a lower hydrocarbon carboxylic acid.

Typical mineral acids include sulfuric acid, hydrochloric acid, phosphoric acid, and the like. Typical lower hydrocarbon carboxylic acids include formic acid, acetic acid, propionic acid, oxalic acid, and the like.

The product is isolated by conventional techniques. For example, after the excess hydrogen peroxide has been removed, the solution is cooled to about 10° C. An ether: water mixture is added and an excess of aqueous sodium hydroxide is added. The product, which separates out as its sodium salt, is filtered off and washed to neutrality. The free acid compound can be regenerated by treating it with a slight excess of acid.

The following examples further serve to illustrate the present process and are presented solely for the purpose of exemplification and are not limitations of the invention.

EXAMPLE 1

(A) To a mixture of 25 g. of 3β-acetoxy stigmasterol in 50 ml. of methylene chloride and 50 ml. of methanol are added 5 g. of sodium hydroxide in 25 ml. of water. This mixture is refluxed for 30 minutes, cooled, and neutralized with 3.75 ml. of sulfuric acid. The mixture is cooled to −50° C. and then a molar equivalent of aqueous peracetic acid is added to the mixture. This mixture is stirred for 30 minutes and 50 ml. of methanol, 5 ml. of sulfuric acid and 100 ml. of water are then added. The organic solvents are then removed by distillation and the residue is cooled and filtered to yield 5α,6β-dihydroxy stigmasterol. This mixture is washed well with water and dried to constant weight.

Similarly 5α,6β-dihydroxy stigmasterol is obtained when 3β-formyoxy stigmasterol, 3β-propionoxy stigmasterol or 3β-caproxy stigmasterol is employed in place of 3β-acetoxy stigmasterol in the above process.

(B) One half of the dried material obtained in part A is suspended in 50 ml. of pyridine and 25 ml. of acetic anhydride. The mixture is allowed to stand for 18 hours; it is then poured into ice water and the solid which forms is collected by filtration. The solid is washed with water and dried under vacuum to yield 3β,6β-diacetoxy-5α-hydroxy stigmasterol.

Similarly, 3β,6β-dipropionoxy-5α-hydroxy stigmasterol is prepared by employing 25 ml. of propionic anhydride in place of acetic anhydride in the above process.

(C) A mixture of 2 g. of 5α,6β-dihydroxy stigmasterol in 8 ml. of pyridine and 4 ml. of acetyl chloride is heated at steam bath temperatures for one hour. The mixture is then poured into ice water and the solid which forms is collected by filtration, washed with water and dried to yield 3β,6β-diacetoxy-5α-hydroxy stigmasterol which is further purified through recrystallization from methylene chloride:hexane.

(D) The other one-half of the dried material obtained in part A is suspended in 25 ml. of acetic anhydride, and a mixture of .040 ml. of perchloric acid in 4.0 ml. of acetic acid is added with stirring over a period of 40 minutes, maintaining the internal temperature below 45° C. Upon completion of the addition, the mixture is stirred for 30 minutes and 25 ml. of water are then added, while maintaining the temperature below 50° C. The total mixture is then added to 400 ml. of water; after stirring this mixture for 30 minutes, the solid is collected by filtration, washed well with water and dried to yield 3β,5α,6β-triacetoxy stigmasterol.

Similarly, 3β,5α,6β-tributoxy stigmasterol is prepared by employing 40 ml. of butyric anhydride in place of acetic anhydride in the above process.

(E) A mixture of 5 g. of 3β,6β-diacetoxy 5α-hydroxy stigmasterol and 250 ml. of anhydrous hexane was cooled to −70° C. While the mixture was stirring, a stream of oxygen gas containing 3 to 4% of ozone was passed through the mixture until the uptake of ozone was complete. Glacial acetic acid (50 ml.) and a hydrogen peroxide (a 30% aqueous solution, 5 ml.) were added, and the resulting mixture was stirred for one hour while allowing the mixture to attain room temperature. The mixture was made basic by the addition of 100 ml. of 2.0 N aqueous sodium hydroxide; the product precipitated out and was filtered off and washed with water. The solid was dried to yield the sodium salt of 3β,6β-diacetoxy 5α-hydroxy bisnorcholanic acid.

The sodium salt was added to a dilute aqueous solution of hydrochloric acid, using sufficient acid to make the resulting mixture acidic. The acidic mixture was extracted with methylene chloride. The methylene chloride extracts were combined, washed with water to neutrality, dried over sodium sulfate, and evaporated under reduced pressure to yield 3β,6β-diacetoxy 5α-hydroxy bisnorcholanic acid.

Similarly, 3β,6β-dipropionoxy 5α-hydroxy disnorcholanic acid is prepared from 3β,6β-dipropionoxy 5α-hydroxy stigmasterol by the process of the above step.

(F) A mixture of 5 g. of 3β,5α,6β-triacetoxy stigmasterol and 200 ml. of anhydrous ethyl acetate was cooled to −80° C. With stirring, a stream of oxygen containing 3 to 4% of ozone was passed through the cooled mixture until the uptake of ozone was complete. Glacial acetic acid (25 ml.) and hydrogen peroxide (a 30% aqueous solution, 5 ml.) were added, and the mixture was stirred for an additional hour while allowing the reaction mixture to attain room temperature. Sodium hydroxide (2.0 N aqueous solution, 100 ml.) was added to the mixture; the solid which formed was filtered off and washed with water. The solid was dried to yield the sodium salt of 3β,5α,6β-triacetoxy bisnorcholanic acid. The sodium salt was added to a 1 N aqueous solution of hydrochloric acid (25 ml.) and the free bisnorcholanic acid was extracted with several portions of methylene chloride. The methylene chloride extracts were combined, washed with water to neutrality, and dried over sodium sulfate and evaporated under vacuum, to yield 3β,5α,6β-triacetoxy bisnorcholanic acid.

Similarly, 3β,5α,6β-tributyryloxy bisnorcholanic acid is prepared from 3β,5α,6β-tributyryloxy stigmasterol by the process of the above step.

What is claimed is:

1. A process for the preparation of bisnorcholanic acid derivatives of the formula:

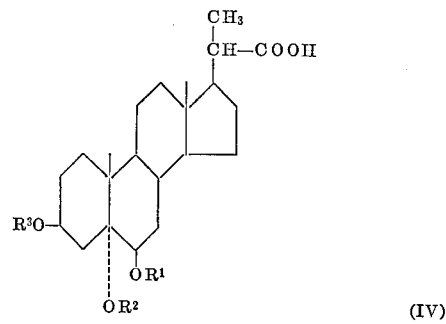

wherein each of $R^1$ and $R^3$ is a (lower) hydrocarbon carboxylic acyl group, and $R^2$ is hydrogen or a (lower) hydrocarbon carboxylic acyl group; which comprises treating a 3β-acyloxy stigmasterol with a peracid, and then with an aqueous acid mixture to obtain 5α,6β-dihydroxy stigmasterol, which after isolation is esterified with a hydrocarbon carboxylic acid anhydride or a hydrocarbon carboxylic acid halide in the presence of an excess of base, or a hydrocrabon carboxylic acid anhydride or a hydrocarbon carboxylic acid in the presence of an acid catalyst to obtain a compound of the formula:

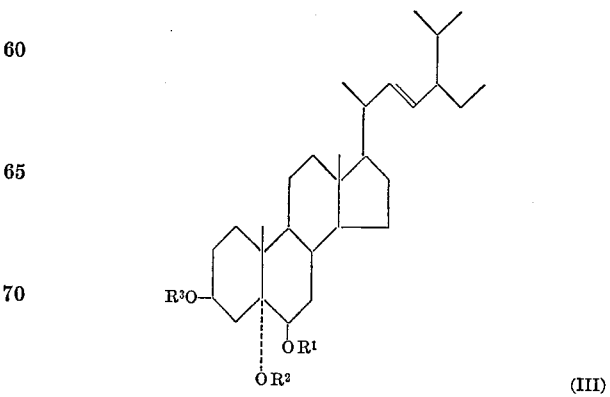

which is ozonized and then treated with an acidic-hydrogen peroxide mixture to obtain a bisnorcholanic acid derivative, a compound of Formula IV.

2. The process according to claim 1 wherein the 3β-acyloxy stigmasterol is 3β-acetoxy stigmasterol.

3. The process according to claim 2 wherein the peracid is peracetic acid, performic acid, perbenzoic acid, perphthalic acid, or m-chloroperbenzoic acid, and the aqueous acid is aqueous sulfuric acid, aqueous hydrochloric acid, aqueous acetic acid, or aqueous formic acid.

4. The process according to claim 3 wherein the hydrocarbon carboxylic acid anhydride is acetic anhydride, the hydrocarbon carboxylic acid halide is acetyl chloride, and the hydrocarbon carboxylic acid is acetic acid.

5. The process according to claim 4 wherein the compound of Formula III is treated with at least a molar equivalent of ozone; then with an aqueous acidic hydrogen peroxide mixture containing about 67% to about 93% by weight of a mineral acid or of a lower hydrocarbon carboxylic acid; and about 10% to about 2% by weight hydrogen peroxide.

6. The process according to claim 5 wherein the treatment with the aqueous acidic-hydrogen peroxide mixture is conducted at temperatures of from about —30° C. to about 20° C.; and the mineral acid is hydrochloric acid, sulfuric acid or phosphoric acid, and the lower hydrocarbon carboxylic acid is formic acid or acetic acid.

7. The process according to claim 5 wherein the compound of Formula III is treated with ozone in a non-aqueous inert organic solvent at temperatures of from about —90° C. to about —20° C.

8. The process according to claim 5 wherein each of $R^1$, $R^2$ and $R^3$ is acetyl.

9. The process according to claim 5 wherein each of $R^1$ and $R^3$ is acetyl and $R^2$ is hydrogen.

10. The process for the preparation of bisnorcholanic acid derivatives, compounds of the formula:

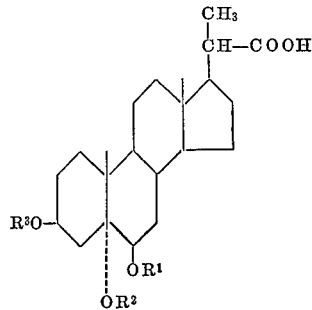

(IV)

wherein each of $R^1$ and $R^3$ is an acetyl group and $R^2$ is hydrogen or an acetyl group; which comprises treating 3β-acetoxy stigmasterol with peracetic acid, performic acid, perbenzoic acid, perphthalic acid or m-chloro perbenzoic acid and then with an aqueous sulfuric acid mixture, aqueous hydrochloric acid mixture, aqueous acetic acid mixture or an aqueous formic acid mixture, to obtain 5α,6β-dihydroxy stigmasterol, which after isolation is esterified with acetic anhydride or acetyl chloride in the presence of an excess of a base or with acetic anhydride or acetic acid in the presence of an acid catalyst to obtain a compound of the formula:

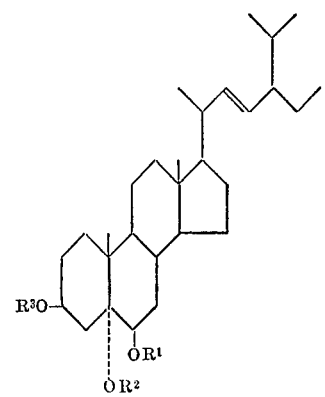

(III)

which is treated with at least a molar equivalent of ozone in a non-aqueous inert organic solvent at temperatures of from about —90° C. to about —20° C. and then treated with an acidic hydrogen peroxide mixture containing about 67% to about 93% by weight of hydrochloric acid, sulfuric acid, phosphoric acid, formic acid or acetic acid and about 10% to about 2% by weight of hydrogen peroxide at temperatures of from about —30° C. to about 20° C. to obtain a bisnorcholanic acid derivative, a compound of Formula IV.

No references cited.

ELBERT L. ROBERTS, *Primary Examiner.*

U.S. Cl. X.R.
260—397.2